US008130600B2

(12) United States Patent
Nakata et al.

(10) Patent No.: US 8,130,600 B2
(45) Date of Patent: Mar. 6, 2012

(54) DRIVE DEVICE, OPTICAL HEAD, AND OPTICAL DISK RECORDING/REPRODUCING DEVICE

(75) Inventors: Hideki Nakata, Kyoto (JP); Masayuki Shiwa, Fukuoka (JP)

(73) Assignee: Panasonic Corporation, Osaka (JP)

( * ) Notice: Subject to any disclaimer, the term of this patent is extended or adjusted under 35 U.S.C. 154(b) by 474 days.

(21) Appl. No.: 12/438,156

(22) PCT Filed: Oct. 9, 2007

(86) PCT No.: PCT/JP2007/069675
§ 371 (c)(1),
(2), (4) Date: Feb. 20, 2009

(87) PCT Pub. No.: WO2008/044674
PCT Pub. Date: Apr. 17, 2008

(65) Prior Publication Data
US 2010/0232265 A1 Sep. 16, 2010

(30) Foreign Application Priority Data

Oct. 11, 2006 (JP) ................................. 2006-277199

(51) Int. Cl.
*G11B 7/00* (2006.01)
*G11B 7/085* (2006.01)
(52) U.S. Cl. .................. 369/30.03; 369/44.37
(58) Field of Classification Search ............... 369/44.37, 369/47.51, 112.01, 223, 218, 30.03, 44.15; 720/676
See application file for complete search history.

(56) References Cited

U.S. PATENT DOCUMENTS

| 7,352,679 B2 * | 4/2008 | Ohno ........................... 369/223 |
| 2003/0112726 A1 | 6/2003 | Ohno |
| 2006/0028935 A1 | 2/2006 | Mori et al. |
| 2006/0143637 A1 | 6/2006 | Torii |

FOREIGN PATENT DOCUMENTS

| CN | 1417778 | 5/2003 |
| CN | 1805024 | 7/2006 |
| JP | 10-3687 | 1/1998 |
| JP | 11-259906 | 9/1999 |
| JP | 2005-78735 | 3/2005 |
| JP | 2006-120283 | 5/2006 |
| JP | 2006-155839 | 6/2006 |

OTHER PUBLICATIONS

International Search Report issued Nov. 6, 2007 in the International (PCT) Application No. PCT/JP2007/069675.
Chinese Office Action issued Jun. 2, 2010 in Chinese Application No. 200780030960.0.

* cited by examiner

*Primary Examiner* — Ali Neyzari
(74) *Attorney, Agent, or Firm* — Wenderoth, Lind & Ponack, L.L.P.

(57) ABSTRACT

A spherical aberration correction mechanism 30 includes a lens holder 35 that holds a collimator lens 16, a main shaft 36a that supports the lens holder 35 in a linearly movable manner, a lead screw 34 supported in a rotatable manner and provided with a screw thread formed of a first slope and a second slope each in a spiral shape on an outer circumference thereof, and a stepping motor 13 that rotates the lead screw 34. The lens holder 35 includes a rack portion 41 disposed between the main shaft 36a and the lead screw 34 and having a slope that abuts on the first slope and first and second stoppers 46a and 46b that regulate a relative position of the rack portion 41 with respect to the lead screw 34 so that the rack portion 41 does not abut on the second slope.

8 Claims, 9 Drawing Sheets

DRIVE DEVICE, OPTICAL HEAD, AND OPTICAL DISK RECORDING/REPRODUCING DEVICE

TECHNICAL FIELD

The present invention relates to a drive device that drives a movable member linearly, and an optical head and an optical disk recording/reproducing device employing the drive device.

BACKGROUND ART

Normally, an optical disk, such as a DVD and a CD, has a light transmitting layer on a recording layer in which information is recorded. Information is recorded in or reproduced from the recording layer by irradiating light onto the recording layer via the light transmitting layer. In a case where the light transmitting layer has an error in thickness and has a difference from a specified value in this instance, this error gives rise to spherical aberration. There is known an optical disk recording/reproducing device configured to correct such spherical aberration, in which a collimator lens formed to be movable is mounted on the optical head, so that the collimator lens is moved to cancel out the spherical aberration according to the thickness of the light transmitting layer (for example, see Patent Document 1).

Figure 9:
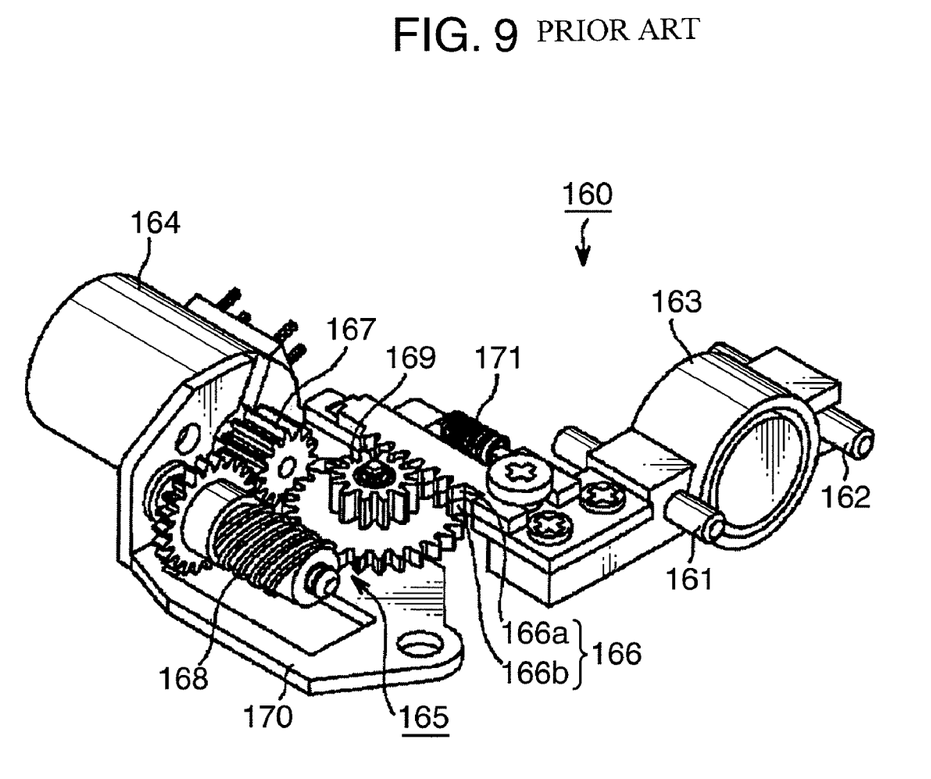
FIG. 9 is a perspective view showing the configuration of a collimator lens drive mechanism employed in a conventional optical disk recording/reproducing device.

FIG. 9 is a perspective view showing the configuration of a collimator lens drive mechanism employed in a conventional optical disk recording/reproducing device. A lens drive mechanism 160 shown in FIG. 9 is configured to move a collimator lens so that spherical aberration is cancelled out according to the thickness of the light transmitting layer of an optical disk. It includes a reference shaft 161 and a sub-reference shaft 162 both disposed parallel to the optical axis and a collimator lens holder 163 supported on these reference shafts 161 and 162.

The reference shaft 161 and the sub-reference shaft 162 are immovably attached to a fixing portion of the optical head. The collimator lens holder 163 is supported on these reference shafts 161 and 162 to be movable by sliding in the optical axis direction. The collimator lens operated to move so as to cancel out the spherical aberration is mounted on the collimator lens holder 163. In other words, the lens drive mechanism 160 moves the collimator lens mounted on the collimator lens holder 163 back and forth and parallel to the optical axis direction by moving the collimator lens holder 163 back and forth along the reference shaft 161 and the sub-reference shaft 162.

The lens drive mechanism 160 includes, as drive mechanisms that move the collimator lens holder 163 back and forth along the reference shaft 161 and the sub-reference shaft 162, a DC motor 164 that serves as a drive source to move the collimator lens holder 163 and a gear mechanism 165 that converts rotations of the DC motor 164 into parallel movements along the optical axis direction and transmits the parallel movements to the collimator lens holder 163. Rotations of the DC motor 164 are converted into parallel movements along the optical axis direction by the gear mechanism 165 so as to move the collimator lens holder 163. The collimator lens is thus moved to cancel out the spherical aberration according to the thickness of the light transmitting layer of an optical disk.

The gear mechanism 165 includes a rack 166 attached to the collimator lens holder 163, a first gear 167 attached to the rotation shaft of the DC motor 164 for transmitting a rotational force of the DC motor 164, a second gear 168 to convert rotations of the DC motor 164 into parallel movements along the optical axis direction, a third gear 169 to transmit a drive force that has been converted into the parallel movements along the optical axis direction by the second gear 168 to the rack 166.

The rack 166 to which the drive force is transmitted from the third gear 169 is of a double structure in which two racks 166a and 166b are superimposed and the racks 166a and 166b are coupled with a spring 171 in order to eliminate a backlash between the rack 166 and the third gear 169.

When the collimator lens is moved using the lens drive mechanism 160, the DC motor 164 is rotated. The first gear 167 consequently starts to rotate. Rotations of the first gear 167 are transmitted to the second gear 168 and converted into parallel movements along the optical axis direction. The drive force converted into the parallel movements along the optical axis direction by the second gear 168 is transmitted to the rack 166 via the third gear 169.

The rack 166 is attached to the collimator lens holder 163 and the collimator lens holder 163 is supported on the reference shafts 161 and 162 to be movable by sliding in the optical axis direction. Accordingly, the collimator lens holder 163 is moved in the optical axis direction by the drive force transmitted to the rack 166 via the third gear 169. The collimator lens mounted on the collimator lens holder 163 is thus moved in the optical axis direction.

The lens drive mechanism 160 configured as above is able to move the collimator lens at some degree of accuracy and is therefore able to correct the spherical aberration resulting from a variance of the light transmitting layer in thickness.

In the lens drive mechanism 160 described above, however, rotational motions of the DC motor 164 within a perpendicular plane is converted to rotational motions within a horizontal plane using the first gear 167, the second gear 168, and the third gear 169 first and thence the rotational motions within a horizontal plane is converted to linear motions using the third gear 169 and the rack 166. This requires a large number of members as motion converting members. In a case where a large number of members are used as above, work errors among the respective members or the like are accumulated, which gives rise to an error at the moving position of the collimator lens holder 163, that is, the collimator lens.

Also, the collimator lens holder 163 is driven using the both slopes of each tooth formed in the respective gears 167 through 169 and the rack 166. Accordingly, in a case where the collimator lens holder 163, that is, the collimator lens, is allowed to reciprocate, one of the slopes of the tooth abuts on the gear when it is moved in a forward direction and the other slope abuts thereon when it is moved in a backward direction. This, in addition to the error described above, gives rise to an error caused by a backlash when the movement directions are switched. It therefore becomes impossible to allow the collimator lens holder 163, that is, the collimator lens, to reciprocate at a high degree of accuracy.

Further, in a case where the third gear 169 and the rack 166 abut on each other using the both slopes of the teeth as described above, it is necessary to increase a pushing force of the spring 171 in order to strengthen the engagement between the third gear 169 and the rack 166. Such a large pushing force becomes a large load for the third gear 169, that is, the DC motor 164. Accordingly, it also becomes impossible to allow the collimator leans holder 163, that is, the collimator lens, to reciprocate at a high degree of accuracy with a low drive force.

Patent Document 1: JP-A-11-259906

DISCLOSURE OF THE INVENTION

An object of the invention is to provide a drive device and an optical head, and an optical disk recording/reproducing device capable of allowing a movable member to reciprocate at a high degree of accuracy using fewer components with a low drive force.

A drive device according to one aspect of the invention is a drive device mounted on an optical head that records information in and/or reproduces information from an optical disk, including: a holding member configured to hold a movable member; a supporting member configured to support the holding member in a linearly movable manner; a lead screw member supported in a rotatable manner and provided with a screw thread formed of a first slope and a second slope each in a spiral shape on an outer circumference thereof; and a drive member configured to rotate the lead screw member. The holding member includes a rack portion disposed between the supporting member and the lead screw member and having a slope that abuts on the first or second slope so as to convert a rotational motion of the lead screw member into a linear motion, and a regulation portion that regulates a relative position of the rack portion with respect to the lead screw member so that the rack portion and the lead screw member do not mesh with each other.

According to the configuration above, it is possible to allow the movable member to reciprocate at a high degree of accuracy using fewer components with a low drive force.

BEST MODE FOR CARRYING OUT THE INVENTION

Figure 1:
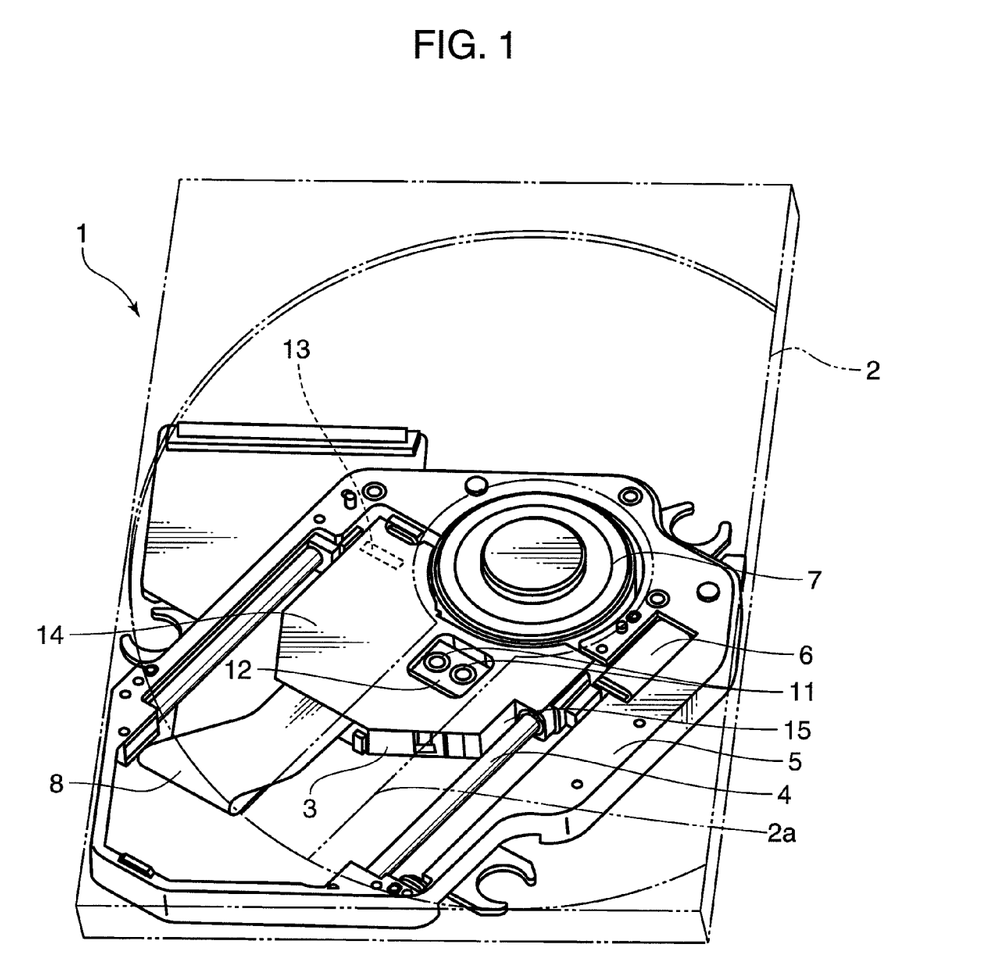
FIG. 1 is a perspective view showing the configuration of an optical disk recording/reproducing device according to one embodiment of the invention.

Hereinafter, one embodiment of the invention will be described with reference to the drawings. FIG. 1 is a perspective view showing the configuration of an optical disk recording/reproducing device according to one embodiment of the invention. For ease of illustration, a drive base to hold a drive cover 2, a mechanical base 5, and the like, a full case to cover the entire drive, and so forth are omitted in FIG. 1.

An optical disk recording/reproducing device 1 shown in FIG. 1 includes a drive cover 2, an optical head 3, a pair of guide shafts 4, a mechanical base 5, a feed motor 6, a turntable 7, and a flexible substrate 8. The optical head 3 includes two types of objective lenses 11, an objective lens actuator 12, a stepping motor 13, a head cover 14, and a head base 15.

As is shown in FIG. 1, the both ends of a pair of the guide shafts 4 are fixed to the mechanical base 5, and the guide shafts 4 support the optical head 3 in a state where it is movable in a radial direction of an optical disk. The feed motor 6 is attached to the mechanical base 5 and moves the optical head 3 in the radial direction of an optical disk using a conversion mechanism that converts rotational motions into linear motions, such as a rack-and-pinion.

The turntable 7 is held by the mechanical base 5 in a rotatable manner. It is rotated by a DD motor (not shown) or the like disposed beneath and rotates an optical disk in a predetermined direction. One end of the flexible substrate 8 is fixed to the optical head 3 and supplies the optical head 3 with various signals, power, and so forth used to control the operations thereof.

The drive cover 2 is formed of a resin or sheet metal member or the like provided with an opening 2a and fixed to the mechanical base 5. The opening 2a is an opening formed by integrating a circular opening through which the turntable 7 is exposed for loading and unloading an optical disk and an oblong opening through which at least the objective lenses 11 can be exposed when the optical head 3 is moved in the radial direction of an optical disk.

The objective lens actuator 12 is attached to the head base 15, and formed of an objective lens holder to hold the two types of objective lenses 11, a suspension to support the objective lens holder in a movable manner, and a magnetic circuit, a focus coil, and a tracking coil to move the objective lens holder, as well as an actuator base to hold the magnetic circuit and the like.

The objective lens actuator 12 drives one objective lens from the two types of objective lenses 11 in a focus direction (a direction substantially perpendicular to the recording surface of an optical disk) and a tracking direction (a direction substantially perpendicular to the recording tracks of an optical disk) with respect to the recording tracks of an optical disk by applying a predetermined drive current to the focus coil and the tracking coil and forms a predetermined light spot on the optical disk. Information is recorded in an optical disk and/or information is reproduced from an optical disk using this light spot.

The stepping motor 13 is attached to the head base 15 and drives a collimator lens 16 (see FIG. 2) described below. As with the known stepping, the operation principle of the stepping motor 13 is to dispose a stator, which is an electromagnet formed of comb-teeth yokes (for example, eight yokes), a bobbin, and a coil, on the outer circumference of a rotor formed of a magnet attached to the rotation shaft, and to rotate the rotor by successively switching the polarities of the comb-teeth yokes.

Figure 2:
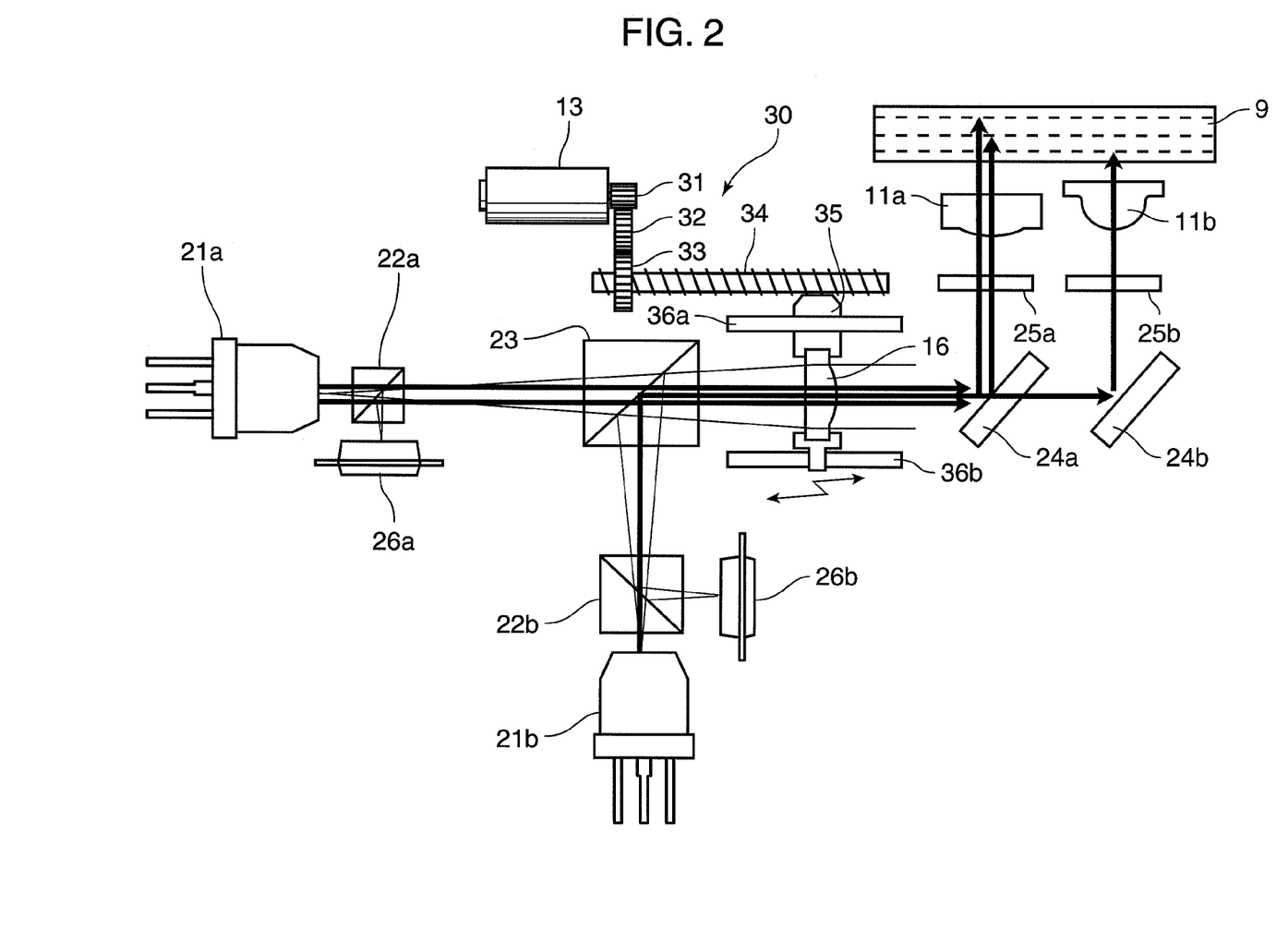
FIG. 2 is a schematic view showing the configuration of an optical system of an optical head shown in FIG. 1.

FIG. 2 is schematic view showing the configuration of an optical system of the optical head 3 shown in FIG. 1. The optical head shown in FIG. 2 includes objective lenses 11a and 11b (the objective lenses 11 shown in FIG. 1), the stepping motor 13, semiconductor lasers 21a and 21b, polarized beam splitters 22a, 22b, and 23, a collimator lens 16, rising mirrors 24a and 24b, wave plates 25a and 25b, photo-detectors 26a and 26b, three gears 31 through 33, a lead screw 34, a lens holder 35, and a main shaft 36a and a sub-shaft 36b as a pair of guide shafts. The stepping motor 13, the three gears 31 through 33, the lead screw 34, the lens holder 35, the main shaft 36a, the sub-shaft 36b, and so forth together form a spherical aberration correction mechanism 30.

In this embodiment, a BD (Blu-ray Disc) with a protection layer (light transmitting layer) having a thickness of about 0.1 mm, a DVD with a protection layer having a thickness of about 0.6 mm, and a CD with a protection layer having a thickness of about 1.2 mm are used as an optical disk 9, and the optical head 3 records/reproduces information in/from these three types of optical disks in the following manners.

Initially, as is shown in FIG. 2, for a CD or a DVD, the semiconductor laser 21a emits one of laser beams having two wavelengths (660 nm and 780 nm), and the polarized beam splitters 22a and 23 transmit the laser beam from the semiconductor laser 21a so as to guide the laser beam to the collimator lens 16. The collimator lens 16 converts the laser beam from the polarized beam splitter 23 into parallel light so as to guide the light beam to the rising mirror 24a. In this instance, the stepping motor 13 adjusts the position of the collimator lens 16 according to the thickness of the protection layer of a CD or a DVD and spherical aberration is corrected.

To be more concrete, the stepping motor 13 rotates the lead screw 34 by sequentially rotating the three gears 31 through 33. The lead screw 34 engages with a rack portion 41 (see FIG. 3 and relevant drawings) of the lens holder 35. Rotational motions of the lead screw 34 are thus converted into linear motions of the lens holder 35. The collimator lens 16 is held by the lens holder 35 and the lens holder 35 is supported on the main shaft 36a and the sub-shaft 36b in a movable manner. Accordingly, the collimator lens 16 is moved in association with movements of the lens holder 35 and the position of the collimator lens 16 is adjusted according to the thickness of the protection layer of the optical disk 9, so that spherical aberration resulting from a difference and a variance in thickness of the protection layer can be corrected.

Motors to which the invention is applied are not particularly limited to the stepping motor described above and various types of stepping motor can be used as well. Alternatively, other motors, such as a DC motor, can be used instead. Also, the number of gears used to transmit a drive force of the stepping motor 13 to the lead screw 34 is not particularly limited to the value specified in the example above. The lead screw may be driven directly by a motor or two or four or more gears may be used. In addition, an error caused by a backlash may be reduced using a double gear as the gear 32. The same can be said about the other gears.

The rising mirror 24a reflects a laser beam having a wavelength of 660 nm or 780 nm so as to guide the laser beam to the objective lens 11a via the wave plate 25a. The objective lens 11a is an objective lens having an NA of 0.65 corresponding to a DVD or a CD and forms a predetermined light spot on the recording surface of the optical disk 9. The light beam reflected on the recording surface of the optical disk 9 is guided to the rising mirror 24a via the wave plate 25a. The rising mirror 24a reflects a laser beam having a wavelength of 660 nm or 780 nm so as to guide the laser beam to the polarized beam splitter 22a via the collimator lens 16 and the polarization beam splitter 23. The polarization beam splitter 22a reflects a laser beam having a wavelength of 660 nm or 780 nm so as to guide the laser beam to the photo-detector 26a. The photo-detector 26a detects reflected light having a wavelength of 660 nm or 780 nm.

For a BD, the semiconductor laser 21b emits a laser beam having a wavelength of 405 nm and the polarized beam splitter 22b transmits the laser beam from the semiconductor laser 21b so as to guide the laser beam to the polarized beam splitter 23. The polarized beam splitter 23 reflects a laser beam having a wavelength of 405 nm so as to guide the laser beam to the collimator lens 16. The collimator lens 16 converts a laser beam from the polarized beam splitter 23 into parallel light so as to guide the light beam to the rising mirror 24a. In this instance, in the same manner as above, the stepping motor 13 adjusts the position of the collimator lens 16 according to the thickness of the protection layer of the BD and spherical aberration is corrected.

The rising mirror 24a transmits a laser beam having a wavelength of 405 nm whereas the rising mirror 24b reflects a laser beam having a wavelength of 405 nm so as to guide the laser beam to the objective lens 11b via the wave plate 25b. The objective lens 11b is an objective lens having an NA of 0.85 corresponding to a BD and forms a predetermined light spot on the recording surface of the optical disk 9. A light beam reflected on the recording surface of the optical disk 9 is guided to the rising mirror 24b via the wave plate 25b. The rising mirror 24b reflects a laser beam having a wavelength of 405 nm so as to guide the laser beam to the rising mirror 24a. The rising mirror 24a transmits a laser beam having a wavelength of 405 nm so as to guide the laser beam to the polarized beam splitter 23 via the collimator lens 16. The polarized beam splitters 23 and 22b reflect a laser beam having a wavelength of 405 nm so as to guide the laser beam to the photo-detector 26b. The photo-detector 26b detects reflected light having a wavelength of 405 nm.

Also, the optical head that records/reproduces information in/from three types of optical disks has been described as an example of the optical head 3. It should be appreciated, however, that the invention is not particularly limited to this example, and the invention can be applied as well to an optical head that records information in and/or reproduces information from one, two, four or more types of optical disks by omitting or adding optical components. Also, the movable member of the invention is not particularly limited to the collimator lens 16 described above, and it may be configured in such a manner so as to move another optical component or the like mounted on the optical head 3, such as a rising mirror.

Figure 3:
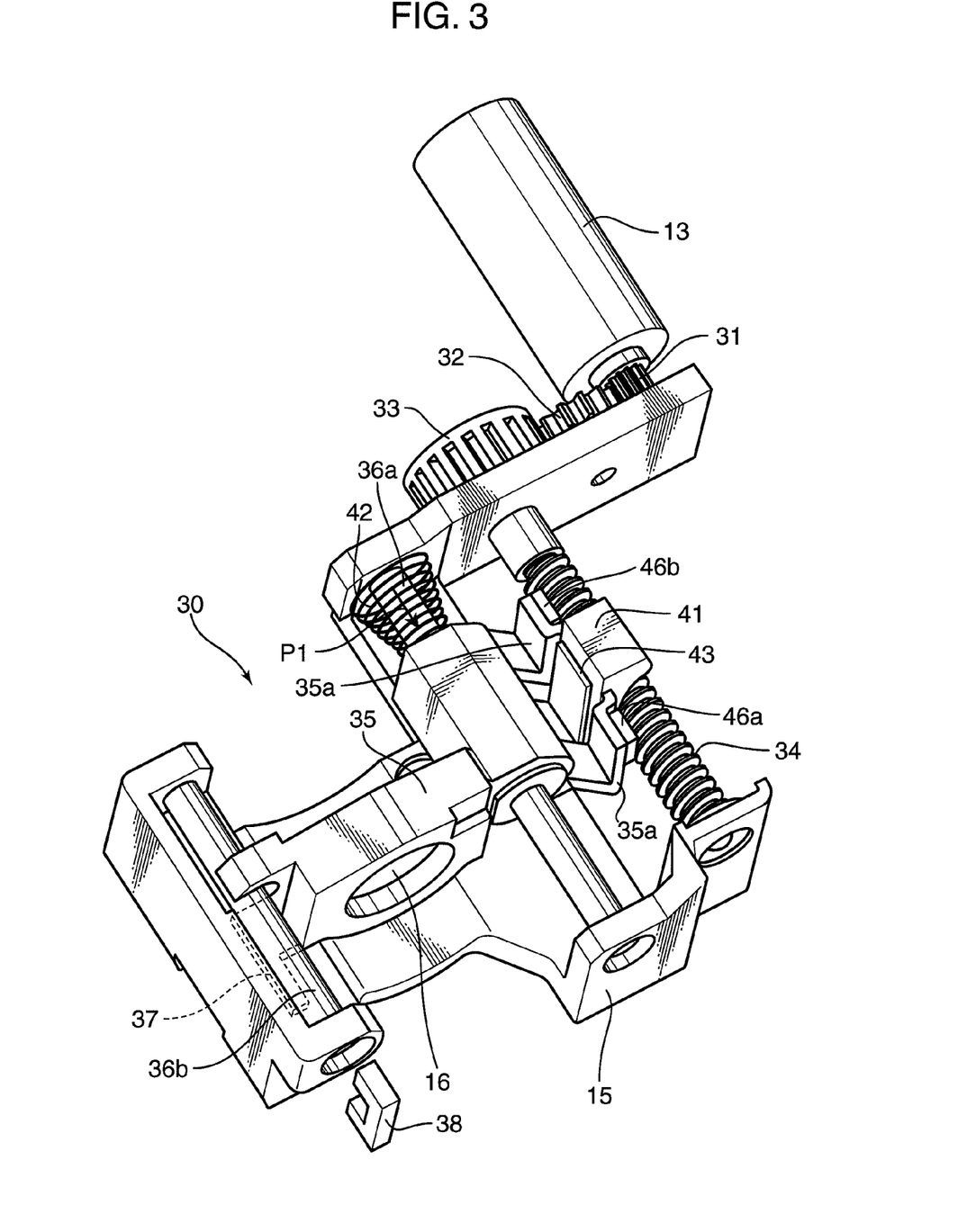
FIG. 3 is a perspective view of a spherical aberration correction mechanism shown in FIG. 2 when viewed from below the optical disk recording/reproducing device.
Figure 4:
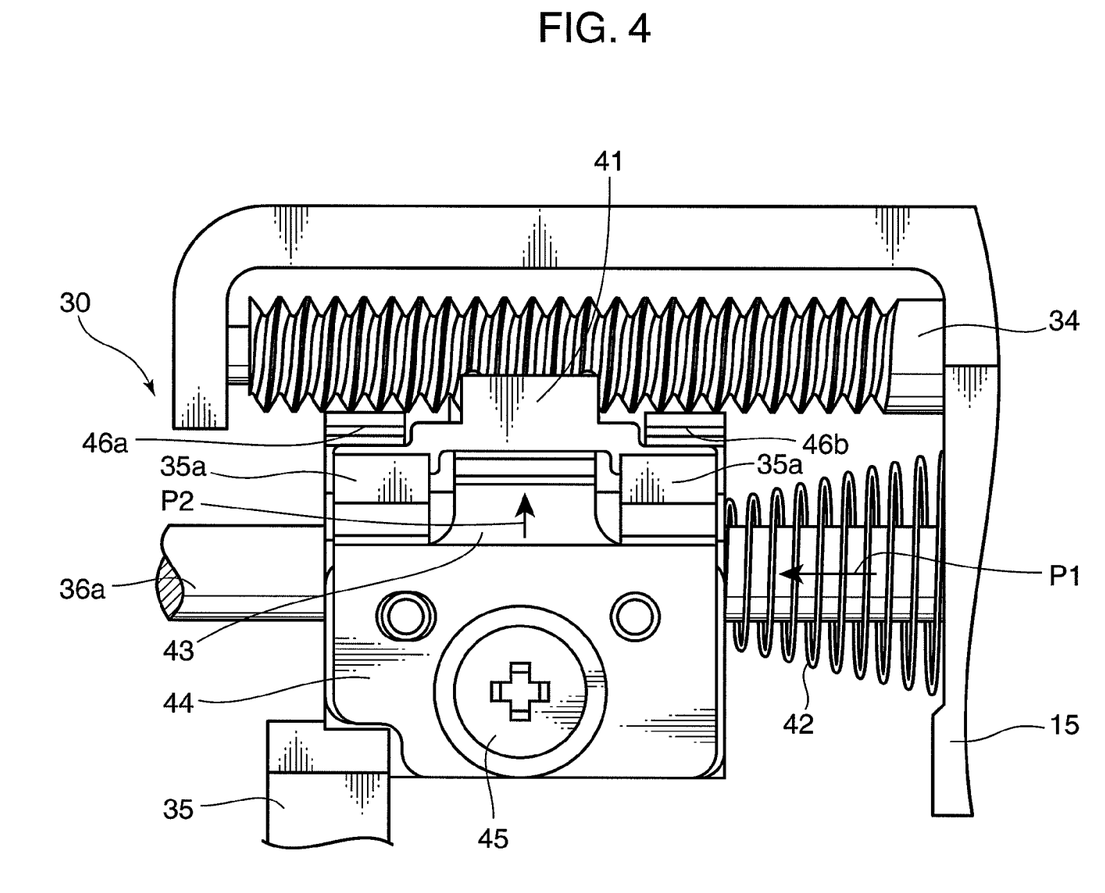
FIG. 4 is a top view of the spherical aberration correction mechanism shown in FIG. 2 when viewed from above the optical disk recording/reproducing device.
Figure 5:
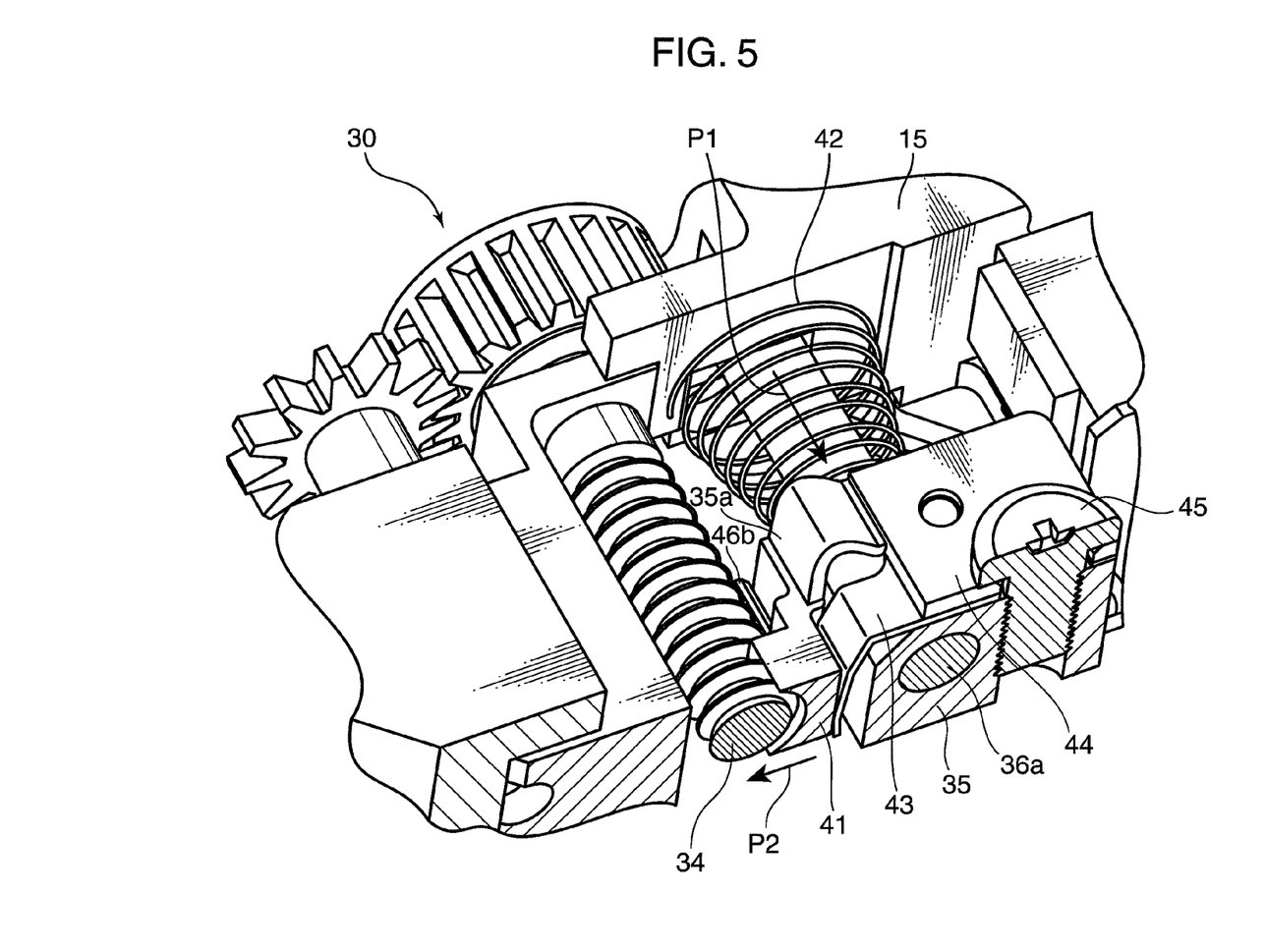
FIG. 5 is a partially cutaway perspective view of the spherical aberration correction mechanism shown in FIG. 2 when viewed from above the optical disk recording/reproducing device.
Figure 6:
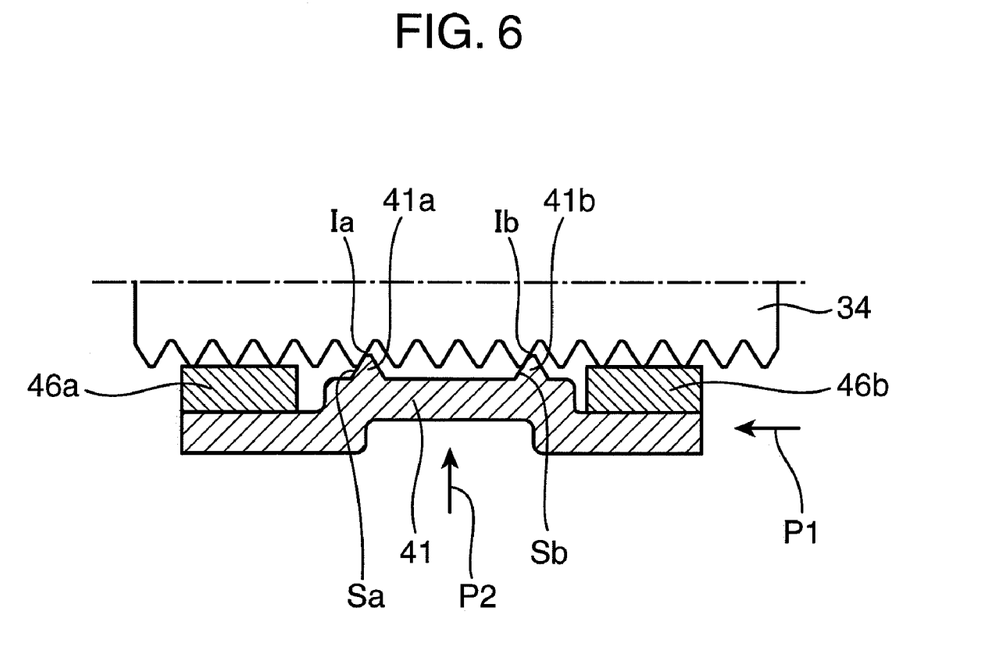
FIG. 6 is a schematic view showing an abutting relation between a rack portion and a lead screw shown in FIG. 3 through FIG. 5.

FIG. 3 is a perspective view of the spherical aberration correction mechanism shown in FIG. 2 when viewed from below the optical disk recording/reproducing device. FIG. 4 is a top view of the spherical aberration correction mechanism shown in FIG. 2 when viewed from above the optical disk recording/reproducing device. FIG. 5 is a partially cutaway perspective view of the spherical aberration correction mechanism shown in FIG. 2 when viewed from above the optical disk recording/reproducing device. FIG. 6 is a schematic view showing an abutting relation between the rack portion and the lead screw shown in FIG. 3 through FIG. 5.

As are shown in FIG. 3 through FIG. 5, the stepping motor 13, the main shaft 36a, and the sub-shaft 36b are fixed to the head base 15 and the gear 32, and the lead screw 34 are supported thereon in a rotatable manner. The gear 31 is fixed to the rotation shaft of the stepping motor 13 and the gear 33 is fixed to the lead screw 34. A screw thread formed of a first slope and a second slope each in a spiral shape is provided to the outer circumference of the lead screw 34.

When the stepping motor 13 rotates, rotations of the stepping motor 13 are transmitted to the lead screw 34 via the gears 31 through 33 and the lead screw 34 starts to rotate. The lead screw 34, the main shaft 36a, and the sub-shaft 36b are disposed adjacently to the stepping motor 13 sequentially in this order almost within a horizontal plane in such a manner that the respective center shafts are parallel to one another.

The collimator lens 16 is fixed to the lens holder 35 and the lens holder 35 is supported on the main shaft 36a and the sub-shaft 36b to be movable along the axial direction of the main shaft 36a. A metal bearing is attached to the lens holder 35 so as to reduce a sliding load of the lens holder 35 applied on the main shaft 36a. In order to reduce the sliding load, a bearing may be provided to each shaft or lubrication oil or the like may be applied on each shaft or each sliding surface.

The lens holder 35 is made of resin or the like and the rack portion 41 is supported elastically on the lens holder 35 to be movable in a direction indicated by an arrow P2 via two rack supporting portions 35a and a fixing plate 44 while it is supported rigidly so as not to move in a direction indicated by an arrow P1. To be more concrete, as is shown in FIG. 5, each rack supporting portion 35a is formed of an elastic body and almost in the shape of a letter L. One ends of the two rack supporting portions 35a are formed integrally with the side face of the fixing plate 44 on the side of the lead screw 34 while the other ends of the two rack supporting portions 35a are formed integrally with the rack portion 41. Accordingly, by fixing the fixing plate 44 together with the blade spring 43 to the lens holder 35 using a screw 45, the rack portion 41 is elastically supported on the lens holder 35 via the two rack supporting portions 35a. The rack portion 41 is thus supported on the lens holder 35 in a movable manner in the direction indicated by the arrow P2. It should be appreciated, however, that the configurations of the lens holder 35, the rack supporting portions 35a, the rack portion 41, and the fixing plate 44 are not particularly limited to those specified in the example above. Various modifications are possible by forming each member from a different member or by forming the rack supporting portions 35a integrally with the lens holder 35 so as to support the rack portion 41 elastically.

The rack portion 41 is disposed in a horizontal plane between the main shaft 36a and the lead screw 34 and has a slope that abuts on the first slope of the lead screw 34. Two stoppers 46a and 46b are fixed to the both sides of the rack portion 41 and the end faces of the stoppers 46a and 46b abut on the outer circumferential surface of the lead screw 34 on one hand, and on the other hand, the relative position of the rack portion 41 with respect to the lead screw 34 is regulated so that the rack portion 41 does not abut on the second slope of the lead screw 34. The rack portion 41 and the stoppers 46a and 46b are made of resin or the like having a low frictional coefficient so as to reduce sliding loads of the rack portion 41 and the stoppers 46a and 46b applied to the lead screw 34.

A conical coil spring 42 is attached using the main shaft 36a as a supporting member between one side face of the lens holder 35 and the attachment face of the head base 15 to which the main shaft 36a is attached. The conical coil spring 42 pushes the lens holder 35 in the direction indicated by the arrow P1. In this case, it is possible to push the lens holder 35, that is, the rack portion 41, in the axial direction of the main shaft 36a by effectively utilizing a space around the main shaft 36a. Hence, not only is it possible to reduce the spherical aberration correction mechanism 30 in size, but it is also possible to generate a pushing force almost uniformly across the entire movable range of the lens holder 35. The pushing force can be thus limited to the minimum required force.

The screw thread provided to the lead screw 34 is formed in a spiral shape from the lower left to the upper right of FIG. 4. Accordingly, torque Ta (torque necessary for the stepping motor 13) needed to drive the rack portion 41 from left to right in the drawing becomes smaller than torque Tb (torque necessary for the stepping motor 13) needed to drive the rack portion 41 from right to left in the drawing. Herein, because the conical coil spring 42 keeps pushing the lens holder 35, that is, the rack portion 41, in the direction indicted by the arrow P1 (a direction from right to left in the drawing), load torque Tc (torque necessary for the stepping motor 13) of the lead screw 34 induced by the pushing force of the conical coil spring 42 is added to the torque Ta in the direction in which the torque is the smaller between the movement directions of the rack portion 41. As has been described, by setting the angle of inclination of the screw thread of the lead screw 34 and the pushing direction of the conical coil spring 42, it becomes possible to reduce the maximum torque that the stepping motor 13 has to generate. The stepping motor 13 can be thus smaller in diameter, which makes it possible to make the optical head 3 and the optical disk recording/reproducing device 1 thinner.

It is preferable that the direction indicated by the arrow P1, which is the pushing direction of the conical coil spring 42, is a pushing direction toward the initial position of the collimator lens 16, that is, a direction in which the lens holder 35 is pushed toward the innermost periphery of an optical disk. As is shown in FIG. 3, a tabular convex portion 37 is formed integrally with the lens holder 35 and a position detection switch 38 formed of a photo-interrupter or the like is fixed to the head base 15 at a predetermined position. At the initial setting, the lens holder 35 is moved in the direction indicated by the arrow P1, and the collimator lens 16 achieving the initial position is detected when the tip end of the convex portion 37 formed integrally with the lens holder 35 goes inside the concave portion of the position detection switch 38. The position of the collimator lens 16 is then adjusted by defining the position moved several steps onward from the initial position as the reference position. In this instance, because the direction indicated by the arrow P1, which is the pushing direction of the conical coil spring 42, is the direction in which the lens holder 35 is pushed toward the innermost periphery, the load induced by a pushing force of the conical coil spring 42 becomes the minimum at the initial position. The stepping motor 13 is thus reduced in diameter, so that even when it generates small torque, it is possible to improve the accuracy of the stopping at the initial position. Hence, the position of the collimator lens 16 thereafter can be adjusted at a high degree of accuracy.

In addition, one end of the blade spring 43 is fixed to the lens holder 35 via the fixing plate 44 using the screw 45 while the other end of the blade spring 43 pushes the rack portion 41 of the lens holder 35 in the direction indicated by the arrow P2. In this case, because the rack portion 41 can be pushed toward the lead screw 34 using a smaller space, the spherical aberration correction mechanism 30 can be reduced in size. In addition, because the blade spring 43 is fixed to the lens holder 35, it is possible to generate a uniform pushing force across the entire movable range of the lens holder 35, which makes it possible to limit the pushing force to the minimum required force.

As is shown in FIG. 6, the rack portion 41 includes a first rack portion 41a and a second rack portion 41b. A pushing force by the conical coil spring 42 in the direction indicated by the arrow P1 and a pushing force by the blade spring 43 in the direction indicated by the arrow P2 are synthesized. Consequently, a pushing force in a vertical direction acts on the left slope (the slope upward to right in the drawing) Sa of the first rack portion 41a and to the left slope (the slope upward to right in the drawing) Sb of the second rack portion 41b. With this pushing force, the left slope Sa of the first rack portion 41a is forced to abut only on a surface accounting, for example, for about ½ of the first slope (the slope upward to right in the drawing) Ia of the lead screw 34 and the left slope Sb of the second rack portion 41b is forced to abut only on a surface accounting, for example, for about ½ of the first slope (the slope upward to right in the drawing) Ib of the lead screw 34. It should be appreciated that the ratio of the abutting surface is not limited to ½ specified above and it can be changed in various manners.

As has been described, the blade spring 43 pushes the first rack portion 41a and the second rack portion 41b toward the lead screw 34 while the conical coil spring 42 pushes the lens holder 35, that is, the first rack portion 41a and the second rack portion 41b, in the axial direction of the main shaft 36a. Hence, the left slope Sa of the first rack portion 41a and the left slope Sb of the second rack portion 41b are forced to abut, respectively, on the first slopes Ia and Ib of the lead screw 34 in a reliable manner. It is therefore possible to prevent the occurrence of an error caused by a backlash in reciprocating motions.

It should be appreciated that the spring that pushes the lens holder 35 in the axial direction of the main shaft 36a is not particularly limited to the spring specified in the example above. Various modifications are possible by using other springs, such as cylindrical coil spring or by forcing the lens holder 35 to abut on the second slope alone by pushing the lens holder 35 in a direction opposite to the direction indicated by the arrow P1. The spring that pushes the first rack portion 41a and the second rack portion 41b toward the lead screw 34 is not particularly limited to the spring specified in the example above, either, and other springs, such as a coil spring, can be used as well.

The first rack portion 41a and the second rack portion 41b are provided at positions three threads apart when measured in terms of the number of threads when the lead screw 34 is viewed in a cross section. In this case, because the first rack portion 41a and the second rack portion 41b are disposed at positions spaced apart only by three threads, it is possible to transmit a drive force in a linear direction to be transmitted to the first rack portion 41a and the second rack portion 41b from the lead screw 34 with precision along the axial direction of the main shaft 36a. The lens holder 35, that is, the collimator lens 16, is thus allowed to reciprocate smoothly. It should be appreciated that the number of threads by which the rack portions 41a and 41b are spaced apart is not particularly limited to the value specified in the example above, and they may be spaced apart by one, two, or four or more threads. The number of rack portions (the number of threads) is not particularly limited to the value specified in the example above, either, and one or three or more rack portions (threads) can be used as well.

Further, the first stopper 46a is disposed at a position only one thread apart to the left from the first rack portion 41a and abuts on the tops of the three threads of the lead screw 34. The second stopper 46b is disposed at a position only one thread apart to the right from the second rack portion 41b and abuts on the tops of three threads of the lead screw 34. In this case, because the first stopper 46a and the second stopper 46b are disposed on the outside of the first rack portion 41a and the second rack portion 41b, respectively, it is possible to regulate the relative positions of the first rack portion 41a and the second rack portion 41b with respect to the lead screw 34 at a high degree of accuracy so that the first rack portion 41a and the second rack portion 41b do not abut on the second slope (the slope downward to right in the drawing) of the lead screw 34.

It should be appreciated that the number and the position of the stoppers are not particularly limited to those specified in the example above. For example, one stopper may be disposed between the first rack portion 41a and the second rack portion 41b or one stopper may be disposed below the first rack portion 41a and the second rack portion 41b. Alternatively, the stoppers may regulate the relative position of the rack portion with respect to the lead screw 34 by abutting on a member other than the lead screw 34, for example, a regulation surface formed by extending a part of the head base 15 to the lower portion of the lead screw 34.

In this embodiment, the collimator lens 16 corresponds to an example of the movable member, the lens holder 35 corresponds to an example of the holding member, the main shaft 36a corresponds to an example of the supporting member, the lead screw 34 corresponds to an example of the lead screw member, the stepping motor 13 corresponds to an example of the drive member, the rack portion 41 (first and second rack portions 41a and 41b) corresponds to an example of the rack portion (first and second rack portions), and the first and second stoppers 46a and 46b correspond to an example of the regulation portion (first and second regulation portions). Also, the conical coil spring 42 corresponds to an example of the first pushing member, the blade spring 43 corresponds to an example of the second pushing member, the optical head 3 corresponds to an example of the optical head, the semiconductor lasers 21a and 21b correspond to an example of the light source, the objective lenses 11 (11a and 11b) corresponds to an example of the objective lens, the objective lens actuator 12 corresponds to an example of the objective lens actuator, the spherical aberration correction mechanism 30 corresponds to an example of the drive device, the turntable 7 corresponds to an example of the rotation mechanism, and the feed motor 6 corresponds to an example of the optical head movement mechanism.

As has been described, in this embodiment, the lens holder 35 holding the collimator lens 16 is supported to be linearly movable. The first and second rack portions 41a and 41b of the rack portion 41 attached to the lens holder 35 respectively have the slopes Sa and Sb that respectively abut on the first slopes Ia and Ib of the lead screw 34. The first and second stoppers 46a and 46b regulate the relative positions of the first and second rack portions 41a and 41b with respect to the lead screw 34 so that the first and second rack portions 41a and 41b do not abut on the second slope of the lead screw member. The first and second rack portions 41a and 41b therefore abut, respectively, on the first slopes Ia and Ib alone that are formed on the lead screw 34. In this instance, when the stepping motor 13 rotates the lead screw 34 via the gears 31 through 33, the rotational motions of the lead screw 34 are converted into linear motions of the first and second rack portions 41a and 41b while the first slopes Ia and Ib of the lead screw 34 alone are abutting on the slopes Sa and Sb of the first and second rack portions 41a and 41b, respectively. The lens holder 35, that is, the collimator lens 16, thus undergoes linear motions.

It thus becomes possible to convert rotational motions of the lead screw 34 directly into linear motions of the lens holder 35 using the lens holder 35 having the first and second rack portions 41a and 41b and the lead screw 34. It thus becomes possible to allow the lens holder 35, that is, the collimator lens 16, to move at a high degree of accuracy using fewer components. In addition, even when the lens holder 35, that is, the collimator lens 16, is allowed to reciprocate by switching the rotation directions of the lead screw 34, the first slopes Ia and Ib of the lead screw 34 alone abut on the slopes Sa and Sb of the first and second rack portions 41a and 41b, respectively. Accordingly, no error caused by a backlash will occur and the lens holder 35, that is, the collimator lens 16, is allowed to reciprocate at a high degree of accuracy. Further, the first slopes Ia and Ib of the lead screw 34 alone abut on the slopes Sa and Sb of the first and second rack portions 41*a* and 41*b*, respectively, and the relative positions of the first and second rack portions 41*a* and 41*b* with respect to the lead screw 34 are regulated so that the first and rack portions 41*a* and 41*b* do not abut on the second slope of the lead screw 34. It is therefore possible to limit a pushing force to push the first and second rack portions 41*a* and 41*b* toward the lead screw 34 to the minimum required force. Hence, the lens holder 35, that is, the collimator lens 16, is allowed to reciprocate at a high degree of accuracy using the stepping motor 13 at a low drive force.

Also, because it is possible to use the stepping motor 13 at a low drive force, the stepping motor 13 can be smaller in diameter. In addition, the spherical aberration correction mechanism 30 can be made thinner because the abutting surfaces of the first and second rack portions 41*a* and 41*b* and the lead screw 34 are disposed between the main shaft 36*a* and the lead screw 34 and any other components is disposed on the top of the lead screw 34. Further, because it is possible to generate a drive force used to drive the lens holder 35 between the main shaft 36*a* and the lead screw 34, the lens holder 35, that is, the collimator lens 16, can be driven smoothly.

As a consequence of the configurations above, not only is it possible to allow the collimator lens 16 to reciprocate at a high degree of accuracy using fewer components with a low drive force, but it is also possible to make the optical head 3 and the optical disk recording/reproducing device thinner.

Figure 7:
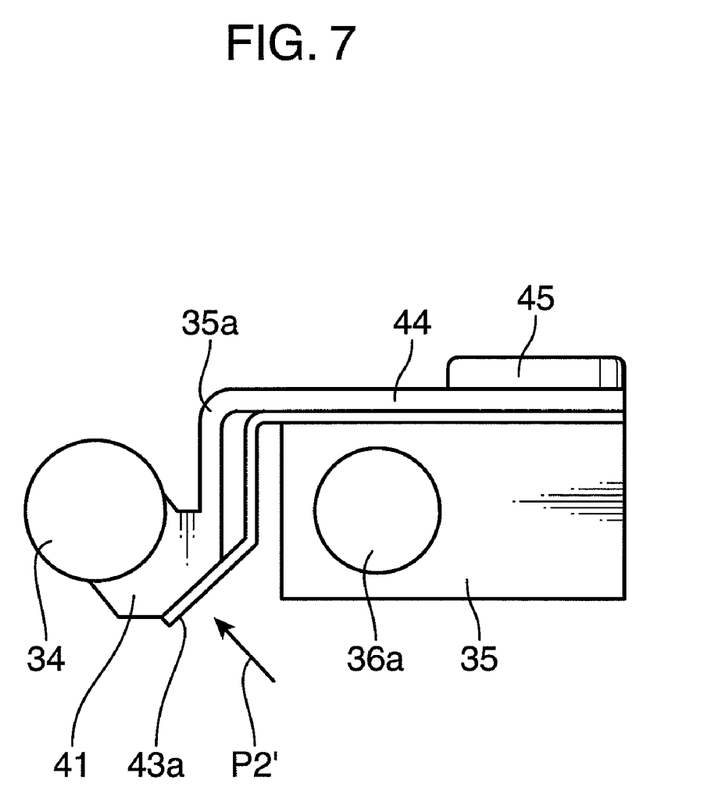
FIG. 7 is a schematic view used to describe an example of another pushing direction of a blade spring in the spherical aberration correction mechanism shown in FIG. 2.

According to the description above, the blade spring 43 pushes the rack portion 41 of the lens holder 35 in the direction indicated by the arrow P2, that is, in the horizontal direction. The pushing direction by the blade spring, however, may be another direction, such as a diagonal direction. FIG. 7 is a schematic view used to describe an example of another pushing direction of the blade spring. In the example shown in FIG. 7, the lens holder 35 is made of resin or the like and the rack portion 41 is elastically supported on the lens holder 35 via the two rack supporting portion 35*a* and the fixing plate 44 to be movable in a direction indicated by an arrow P2', that is, in a diagonal direction at 45 degrees. One end of the blade spring 43*a* is fixed to the lens holder 35 using the screw 45 via the fixing plate 44 and the other end of the blade spring 43*a* pushes the rack portion 41 of the lens holder 35 in the direction indicated by the arrow P2', that is, in a diagonal direction at 45 degrees from bottom to top. In this case, a pushing force in the direction indicated by the arrow P2' has not only a pushing component in the horizontal direction but also a pushing component in a vertical direction from bottom to top. Hence, even in a case where a disturbance is exerted in a top-bottom direction or there is rattling in the top-bottom direction, it is possible to hold the lens holder 35, that is, the collimator lens 16, in a stable manner. It should be appreciated that the pushing direction of the blade spring is not particularly limited to the direction specified in the example above and it can be changed in various manners. The same advantage can be achieved by pushing the lens holder 35 at another angle, for example, in a diagonal direction at 45 degrees from top to bottom.

Figure 8:
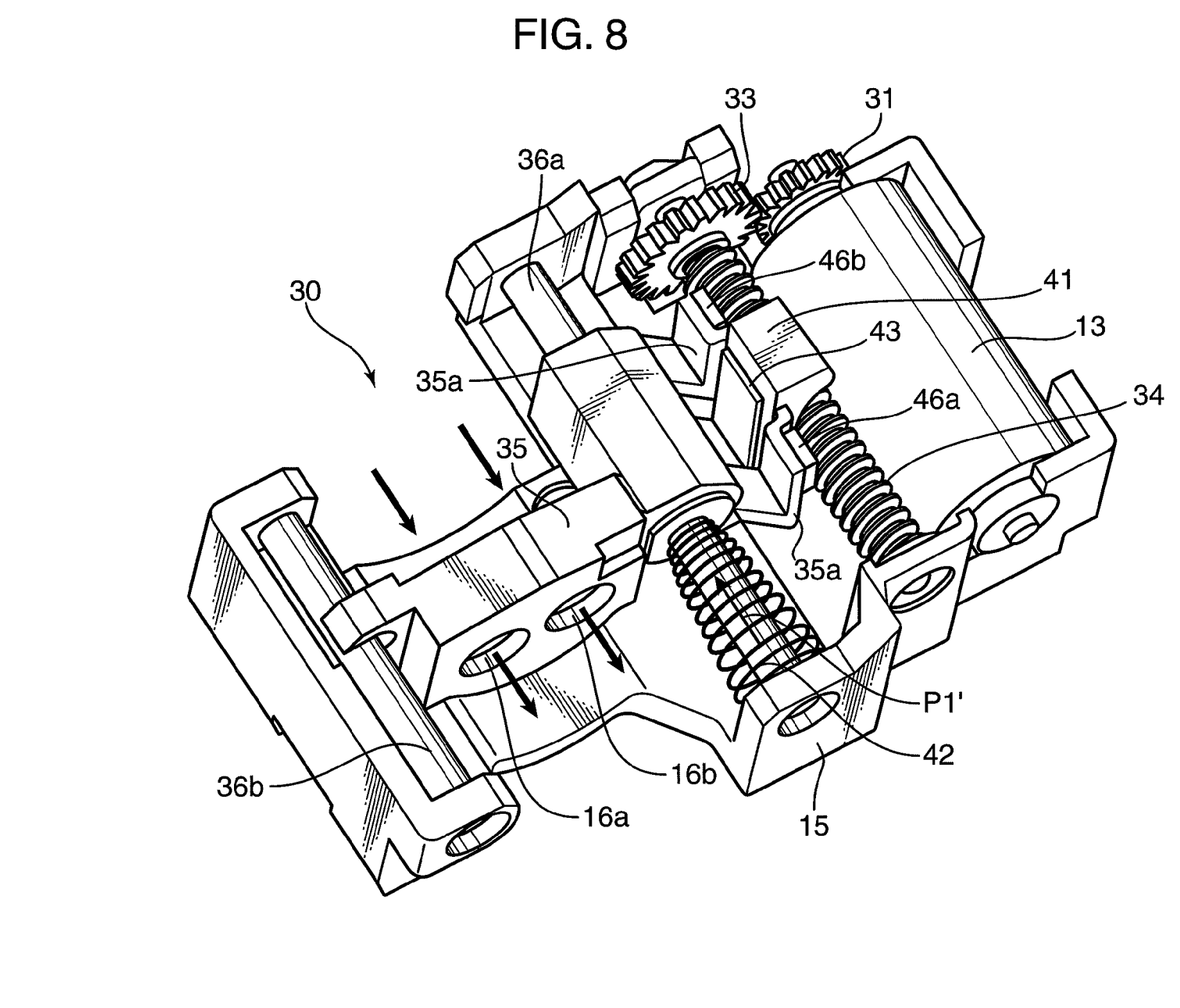
FIG. 8 is a perspective view of another special aberration correction mechanism of the invention when viewed from below the optical disk recording/reproducing device.

The pushing direction of the conical coil spring 42 is not particularly limited to the direction specified in the example above, either, and it can be changed in various manners. FIG. 8 is a perspective view of another example of the spherical aberration correction mechanism of the invention when viewed from below the optical disk recording/reproducing device. The spherical aberration correction mechanism shown in FIG. 8 is different from the spherical aberration correction mechanism shown in FIG. 3 in the following points: two collimator lenses 16*a* and 16*b* are fixed to the lens holder 35; the conical coil spring 42 is disposed on the side opposite to the side in the example above, so that the lens holder 35 is pushed toward the maximum moving positions of the collimator lens 16*a* and 16*b*, that is, toward the outermost periphery of an optical disk; and two gears 31 and 33 are used and the locations of the stepping motor 13 and the gears 31 and 33 are changed to the side of the collimator lens 16. The rest is the same as the spherical aberration correction mechanism shown in FIG. 3 and a detailed description thereof is omitted herein.

The collimator lens 16*a* shown in FIG. 8 is a collimator lens for BD on which a ray for a BD goes incident and the collimator lens 16*b* is a collimator lens for CD and DVD on which a ray for a CD or a DVD goes incident. These collimator lenses are used selectively according to the type of an optical disk being loaded.

The stepping motor 13 and the gears 31 and 33 are disposed on the side of the collimator lenses 16*a* and 16*b*. The gear 31 is fixed to the rotation shaft of the stepping motor 13 and rotations of the gear 31 are transmitted to the lead screw 34 via the gear 33. Also, the conical coil spring 42 pushes the lens holder 35 along a direction indicated by an arrow P1' and thereby pushes the lens holder 35 toward the maximum moving positions of the collimator lenses 16*a* and 16*b*, that is, toward the outermost periphery of an optical disk.

As has been described, the number of collimator lenses mounted on the lens holder 35 is not particularly limited to the value specified in the example shown in FIG. 3. Various modifications are possible by providing two or more collimator lenses or by using the collimator lens 16*a* or 16*b* also for a HD-DVD. The pushing direction of the conical coil spring is not particularly limited to the direction specified in the example shown in FIG. 3, either. The pushing direction may be another direction, such as a direction in which the collimator lens 16 is pushed toward the maximum moving position, that is, in a direction in which the lens holder 35 is pushed toward the outermost periphery of an optical disk. Further, the number of gears and the locations of the stepping motor and the gears are not particularly limited to those specified in the example shown in FIG. 3 and various modifications are possible. Consequently, almost the same advantages as the example shown in FIG. 3 can be achieved in the example shown in FIG. 8.

Also, the conical coil spring 42 may be omitted, so that the rack portion 41 of the lens holder 35 is pushed in the direction indicated by the arrow P2 alone using the blade spring 43 alone, or merely the conical coil spring 42 may be omitted. In this instance, it is preferable that the first and second stoppers 46*a* and 46*b* regulate the relative position of the rack portion 41 with respect to the lead screw 34 so that the rack portion 41 and the lead screw 34 do not mesh with each other, that is, the both slopes of the rack portion 41 do not abut on the both slopes of the lead screw 34 at the same time. For example, it is preferable that the first and second stoppers 46*a* and 46*b* regulate the relative position of the rack portion 41 with respect to the lead screw 34 so that the left slopes Sa and Sb, respectively, of the first rack portion 41*a* and the second rack portion 41*b* (or the slopes on the opposite side) shown in FIG. 6 abut on at least $\frac{2}{3}$ (preferably, at least $\frac{3}{4}$) of the first slopes Ia and Ib (or the second slope on the opposite side) of the lead screw 34, and the slopes Sa and Sb and the slopes on the opposite side never abut on the first slopes Ia and Ib and the second slope on the opposite side, respectively. In this case, a clearance between the lead screw 34 and the rack portion 41 can be an error caused by a backlash. This clearance, however, can be made sufficiently smaller. It is therefore possible to allow the lens holder 35, that is, the collimator lens 16, to reciprocate at a high degree of accuracy.

In the embodiment described above, the drive device of the invention is applied to the spherical aberration correction mechanism of the optical disk recording/reproducing device. It should be appreciated, however, that the invention is not particularly limited to this example, and the invention is also applicable to various types of devices as long as the device is configured to drive a movable member linearly, and the same advantage can be achieved in any application.

From the embodiment described above, the invention can be summarized as follows. That is, a drive device of the invention mounted on an optical head that records information in and/or reproduces information from an optical disk includes: a holding member configured to hold a movable member; a supporting member configured to support the holding member in a linearly movable manner; a lead screw member supported in a rotatable manner and provided with a screw thread formed of a first slope and a second slope each in a spiral shape on an outer circumference thereof; and a drive member configured to rotate the lead screw member. The holding member includes a rack portion disposed between the supporting member and the lead screw member and having a slope that abuts on the first or second slope so as to convert a rotational motion of the lead screw member into a linear motion, and a regulation portion that regulates a relative position of the rack portion with respect to the lead screw member so that the rack portion and the lead screw member do not mesh with each other.

This drive device is able to convert rotational motions of the lead screw member directly into linear motions of the holding member using the holding member provided with the rack portion and the lead screw member. It is therefore possible to allow the holding member, that is, the movable member, to move at a high degree of accuracy using fewer components. In addition, because the relative position of the rack portion and the lead screw member is regulated so that the rack portion and the lead screw member do not mesh with each other even when the holding member is allowed to reciprocate by switching the rotation directions of the lead screw member, not only is it possible to suppress an error caused by a backlash, but it is also possible limit a pushing force by which the slope of the rack portion is forced to abut on the first or second slope of the lead screw member to the minimum required force. It is therefore possible to allow the holding member, that is, the movable member, to reciprocate at a high degree of accuracy with a low drive force using the drive member at a low drive force. Consequently, the drive device mounted on the optical head that records information in and/or reproduces information from an optical disk becomes capable of allowing the movable member to reciprocate at a high degree of accuracy using fewer components with a low drive force.

It is preferable that the slope of the rack portion abuts on the first slope, and that the regulation portion regulates the relative position of the rack portion with respect to the lead screw member so that the rack portion does not abut on the second slope.

In this case, the holding member that holds the movable member is supported in a linearly movable manner. The rack portion of the holding member has the slope that abuts on the first slope of the lead screw member, and the regulation portion regulates the relative position of the rack portion with respect to the lead screw member so that the rack portion does not abut on the second slope of the leas screw member. Consequently, the rack portion of the holding member abuts on the first slope alone that is formed on the lead screw member.

In this instance, when the drive member rotates the lead screw member, the first slope of the lead screw member alone abuts on the slope of the rack portion. Rotational motions of the lead screw member are therefore converted into linear motions of the rack portion. The holding member, that is, the movable member, thus undergoes linear motions.

Hence, rotational motions of the lead screw member can be directly converted into linear motions of the holding member using the holding member provided with the rack portion and the lead screw member. It is therefore possible to allow the holding member, that is, the movable member, to move at a high degree of accuracy using fewer components. In addition, because the first slope of the lead screw member alone abuts on the slope of the rack portion, even when the holding member is allowed to reciprocate by switching the rotation directions of the lead screw member, no error caused by a backlash will occur. The holding member, that is, the movable member, is thus allowed to reciprocate at a high degree of accuracy. Further, the first slope of the lead screw member alone abuts on the slope of the rack portion, and the relative position of the rack portion with respect to the lead screw member is regulated so that the rack portion does not abut on the second slope of the lead screw member. It is therefore possible to limit a pushing force by which the slope of the rack portion is forced to abut on the first slope of the lead screw member to the minimum required force. It thus becomes possible to allow the holding member, that is, the movable member, to reciprocate at a high degree of accuracy using a drive member at a low drive force. Consequently, it becomes possible to allow the movable member to reciprocate at a high degree of accuracy using fewer components with a low drive force.

As has been described, rotational motions of the lead screw member can be directly converted to linear motions of the holding member using the holding member provided with the rack portion and the lead screw member. It thus becomes possible to allow the holding member, that is, the movable member, to move at a high degree of accuracy using fewer components. In addition, because the first slope of the lead screw member alone abuts on the slope of the rack portion, even when the holding member is allowed to reciprocate by switching the rotation directions of the lead screw member, no error caused by a backlash will occur. The holding member, that is, the movable member, is thus allowed to reciprocate at a high degree of accuracy. Further, the first slope of the lead screw member alone abuts on the slope of the rack portion, and the relative position of the rack portion with respect to the lead screw member is regulated so that the rack portion does not abut on the second slope of the lead screw member. It is therefore possible to limit a pushing force by which the slope of the rack portion is forced to abut on the first slope of the lead screw member to the minimum required force. It is therefore possible to allow the holding member, that is, the movable member, to reciprocate at a high degree of accuracy using a drive member at a low drive force. It thus becomes possible to allow the movable member to reciprocate at a high degree of accuracy using fewer components with a low drive force.

It is preferable that the drive device further includes a first pushing member that pushes the rack portion along an axial direction of the supporting member so that the slope of the rack portion abuts on the first slope, and a second pushing member that pushes the rack portion toward the lead screw member so that the slope of the rack portion abuts on the first slope.

In this case, not only the first pushing member pushes the rack portion along the axial direction of the supporting member, but also the second pushing member pushes the rack portion toward the lead screw member. It is therefore possible to force the slope of the rack portion to abut on the first slope of the lead screw member in a reliable manner. The occurrence of an error caused by a backlash in reciprocating motions can be thus prevented in a reliable manner.

It is preferable that the first pushing member includes a coil spring that pushes the rack portion along the axial direction of the supporting member.

In this case, the rack portion can be pushed along the axial direction of the supporting member by effectively utilizing a space around the supporting member. Hence, not only can the drive device be reduced in size, but an almost uniform pushing force can be generated across the entire movable range of the holding member. It is therefore possible to limit the pushing force to the minimum required force.

It is preferable that the second pushing member includes a blade spring that is fixed to the holding member at one end and pushes the rack portion toward the lead screw member at the other end.

In this case, the rack portion can be pushed toward the lead screw member using a smaller space. Hence, the drive device can be reduced in size. In addition, because the blade spring is fixed to the holding member, a uniform pushing force can be generated across the entire movable range of the holding member. It is therefore possible to limit the pushing force to the minimum required force.

It is preferable that an axial direction of the supporting member is almost parallel to an axial direction of the lead screw member, and that the rack portion includes a first rack portion having a slope that abuts on a first slope of a first thread when the lead screw member is viewed in a cross section and a second rack portion having a slope that abuts on a first slope of a second thread at a position at least one thread apart from the first thread.

In this case, the first rack portion and the second rack portion are located at positions spaced apart at least by one thread. Hence, it is possible to transmit a drive force in a linear direction to be transmitted to the first rack portion and the second rack portion from the lead screw member precisely along the axial direction of the supporting member. The holding member, that is, the movable member, is thus allowed to reciprocate smoothly.

It is preferable that the regulation portion includes a first regulation portion disposed on an outside of the first rack portion and a second regulation portion disposed on an outside of the second rack portion.

In this case, the first regulation portion and the second regulation portion are disposed on the outside of the first rack portion and the second rack portion, respectively. It is therefore possible to regulate the relative position of the rack portion with respect to the lead screw member at a high degree of accuracy so that the rack portion does not abut on the second slope.

It is preferable that the movable member includes a collimator lens used to correct spherical aberration of the optical head.

In this case, because the collimator lens is allowed to move at a high degree of accuracy, it is possible to reduce spherical aberration of the optical head.

An optical head of the invention includes: a light source configured to emit light; an objective lens configured to collect the light emitted from the light source onto an optical disk; an objective lens actuator configured to drive the objective lens in a focus direction and a tracking direction of the optical disk; a movable member disposed in an optical path between the light source and the objective lens; and the drive device described above and configured to drive the movable member.

In this optical head, it is possible to allow the movable member disposed in an optical path between the light source and the objective lens to reciprocate at a high degree of accuracy using fewer components with a low drive force. Hence, not only can spherical aberration or the like of the optical head be corrected at a high degree of accuracy, but also the optical head can be reduced both in size and thickness.

An optical disk recording/reproducing device of the invention includes: a rotation mechanism configured to rotate an optical disk; the optical head described above; and an optical head movement mechanism configured to move the optical head in a radial direction of the optical disk.

In this optical disk recording/reproducing device, it is possible to allow the movable member disposed in an optical path between the light source and the objective lens to reciprocate at a high degree of accuracy using fewer components with a low drive force. Hence, not only can spherical aberration or the like of the optical head be corrected at a high degree of accuracy, but also the optical disk recording/reproducing device can be made thinner.

INDUSTRIAL APPLICABILITY

The drive device of the invention is capable of allowing the movable member to reciprocate at a high degree of accuracy using fewer components with a low drive force, and is therefore useful as a drive device mounted on an optical head that records information in and/or reproduces information from an optical disk for driving the movable member linearly.

What is claimed is:
1. A drive device mounted on an optical head that records information in and/or reproduces information from an optical disk, comprising:
a holding member configured to hold a movable member;
a supporting member configured to support the holding member in a linearly movable manner;
a lead screw member supported in a rotatable manner and provided with a screw thread formed of a first slope and a second slope each in a spiral shape on an outer circumferential surface thereof; and
a drive member configured to rotate the lead screw member,
wherein the holding member includes:
a rack portion disposed between the supporting member and the lead screw member and having a slope that abuts on the first slope so as to convert a rotational motion of the lead screw into a linear motion; and
a regulation portion that regulates a relative position of the rack portion with respect to the lead screw member so that the rack portion does not abut on the second slope, and
wherein the drive device further comprises:
a first pushing member that pushes the rack portion along an axial direction of the supporting member so that the slope of the rack portion abuts on the first slope; and
a second pushing member that pushes the rack portion toward the lead screw member so that the slope of the rack portion abuts on the first slope.
2. The drive device according to claim 1, wherein:
the first pushing member includes a coil spring that pushes the rack portion along the axial direction of the supporting member.

3. The drive device according to claim 1, wherein:
the second pushing member includes a blade spring that is fixed to the holding member at one end and pushes the rack portion toward the lead screw member at the other end.

4. A drive device mounted on an optical head that records information in and/or reproduces information from an optical disk, comprising:
a holding member configured to hold a movable member;
a supporting member configured to support the holding member in a linearly movable manner;
a lead screw member supported in a rotatable manner and provided with a screw thread formed of a first slope and a second slope each in a spiral shape on an outer circumferential surface thereof; and
a drive member configured to rotate the lead screw member,
wherein the holding member includes:
a rack portion disposed between the supporting member and the lead screw member and having a slope that abuts on the first slope so as to convert a rotational motion of the lead screw into a linear motion; and
a regulation portion that regulates a relative position of the rack portion with respect to the lead screw member so that the rack portion does not abut on the second slope,
wherein an axial direction of the supporting member is almost parallel to an axial direction of the lead screw member, and
wherein the rack portion includes:
a first rack portion having a slope that abuts on a first slope of a first thread when the lead screw member is viewed in a cross section; and
a second rack portion having a slope that abuts on a first slope of a second thread at a position at least one thread apart from the first thread.

5. The drive device according to claim 4, wherein the regulation portion includes:
a first regulation portion disposed on an outside of the first rack portion; and
a second regulation portion disposed on an outside of the second rack portion.

6. The drive device according to claim 1, wherein:
the movable member includes a collimator lens used to correct spherical aberration of the optical head.

7. An optical head, comprising:
a light source configured to emit light;
an objective lens configured to collect the light emitted from the light source onto an optical disk;
an objective lens actuator configured to drive the objective lens in a focus direction and a tracking direction of the optical disk;
a movable member disposed in an optical path between the light source and the objective lens; and
a drive device configured to drive the movable member,
wherein the drive device comprises:
a holding member configured to hold the movable member;
a supporting member configured to support the holding member in a linearly movable manner;
a lead screw member supported in a rotatable manner and provided with a screw thread formed of a first slope and a second slope each in a spiral shape on an outer circumferential surface thereof; and
a drive member configured to rotate the lead screw member,
wherein the holding member includes:
a rack portion disposed between the supporting member and the lead screw member and having a slope that abuts on the first slope so as to convert a rotational motion of the lead screw into a linear motion; and
a regulation portion that regulates a relative position of the rack portion with respect to the lead screw member so that the rack portion does not abut on the second slope.

8. An optical disk recording/reproducing device, comprising:
a rotation mechanism configured to rotate an optical disk;
the optical head set forth in claim 7; and
an optical head movement mechanism configured to move the optical head in a radial direction of the optical disk.

* * * * *